United States Patent [19]

Burkarth

[11] Patent Number: 5,038,256
[45] Date of Patent: Aug. 6, 1991

[54] LIGHTING FIXTURE WITH DIFFUSER FOR LIGHT AND AIR

[75] Inventor: Jack Burkarth, Dallas, Tex.

[73] Assignee: Gulton Industries, Inc., Plano, Tex.

[21] Appl. No.: 412,828

[22] Filed: Sep. 26, 1989

Related U.S. Application Data

[63] Continuation-in-part of Ser. No. 129,258, Dec. 7, 1987, Pat. No. 4,907,142.

[51] Int. Cl.⁵ .......................... B60Q 1/00; F21S 3/00; F21V 29/00
[52] U.S. Cl. ..................................... 362/74; 362/224; 362/260; 362/294; 362/373
[58] Field of Search ................... 362/74, 96, 223, 224, 362/282, 287, 427, 260, 290, 291, 294, 218, 373

[56] References Cited

U.S. PATENT DOCUMENTS

| | | | |
|---|---|---|---|
| 1,706,694 | 3/1929 | Kimbel | 362/74 |
| 2,238,847 | 12/1936 | Dreyfuss | 362/74 |
| 2,284,534 | 5/1941 | Orth | 362/224 |
| 2,587,807 | 3/1952 | Arenberg | 362/74 |
| 2,845,854 | 8/1958 | Kurek | 362/217 |
| 3,035,161 | 5/1962 | Kalt | 362/74 |
| 3,101,038 | 8/1963 | Archer | 362/217 |
| 3,152,277 | 7/1961 | Cutler et al. | 362/260 |
| 3,210,875 | 10/1965 | Schwenkler | 362/74 |
| 3,211,904 | 10/1965 | Schwenkler | 362/74 |
| 3,246,137 | 4/1966 | Zagel | 362/218 |
| 3,348,465 | 11/1964 | Kruger | 362/96 |
| 4,157,584 | 6/1979 | Bhatt | 362/74 |
| 4,387,415 | 6/1983 | Domas | 362/74 |
| 4,425,603 | 1/1984 | Courson | 362/222 |
| 4,574,336 | 3/1986 | Mikalonis | 362/74 X |
| 4,625,267 | 11/1986 | Mikalonis | 362/224 |

FOREIGN PATENT DOCUMENTS

| | | | |
|---|---|---|---|
| 538837 | 6/1955 | Belgium | 362/218 |
| 831687 | 2/1952 | Fed. Rep. of Germany. | |
| 844495 | 7/1952 | Fed. Rep. of Germany. | |

Primary Examiner—Ira S. Lazarus
Assistant Examiner—Peggy A. Neils
Attorney, Agent, or Firm—Darby & Darby

[57] ABSTRACT

A fixture for a fluorescent lamp includes a diffuser panel. The diffuser panel has a frame and longitudinal elements supported by the frame and spaced apart from one another. At least some of the elements are constructed of a material to allow diffusion of impinging light. Preferred materials are translucent or transparent, such as glass or plastic. The diffuser panel also functions as an air diffuser. Provision of a nozzle in the base of the fixture allows air to flow through the panel by a sucking effect created by high velocity forced air flowing through the nozzle. This results in fixture cleaning and temperature equalization. The fixture is particularly adapted to be mounted in a moving vehicle. For this purpose, the panel is designed to be tamper-resistant and to provide easy maintenance. The diffuser panel, when a latch is opened, may be lowered by rotation to provide access to the lamp and ballast. When the fixture is installed in a public vehicle, a handrail is provided which forms part of the panel lowering mechanism. Other arrangements provide a fixture having a diffuser with a central open portion and a pair of side panels extending across the ceiling of a vehicle. A pair of nozzle elements are disposed above each side panel. Again, high velocity air directed through one portion of a nozzle element will cause air to be drawn through the open central portion of the fixture. Either the entire diffuser or the side panels may be lowered to clean the fixture or replace the lamps.

22 Claims, 7 Drawing Sheets

LIGHTING FIXTURE WITH DIFFUSER FOR LIGHT AND AIR

CROSS REFERENCE TO RELATED APPLICATIONS:

This is a continuation-in-part application of U.S. patent application Ser. No. 129,258 filed Dec. 7, 1987 now U.S. Pat. No. 4,907,142.

BACKGROUND OF THE INVENTION

1. Field of the Invention

The present invention relates to fluorescent fixtures having light diffusers and, more particularly, such fixtures for use in moving vehicles which also include air diffusers.

2. Description of the Related Art

Many existing public vehicles have antiquated fluorescent fixtures. These fixtures were installed many years ago when the vehicles were new and often little attention was paid at that time to providing fixtures which had adequate light diffusers. Also, for such fixtures, a requirement exists for providing air diffusion and circulation around the fluorescent lamp for purposes of cooling and for self-cleaning. With additional requirements for allowing easy maintenance for these fixtures and for making the fixtures vandal-resistant, such fixtures and diffusers are difficult to design since significant tradeoffs are necessary in order to meet all desired conditions.

One particular application for such improved design is the needed replacement of the existing fluorescent fixtures in the cars of the London subway system. Such cars have open fluorescent fixtures disposed in two parallel paths along the car ceiling. The fixtures have no diffusers of any kind and the lamps in the fixtures may be readily broken either accidentally or by vandals. Further, the glare of the lamps is unpleasant and the lamps provide levels of light which are considered excessive for normal reading. The lighting effect is not aesthetic to the viewer, in general. The ballasts for the lamps are also generally difficult to reach for purposes of servicing.

Other prior vehicle lighting systems do not integrate the air circulation system of the vehicle with the lighting system.

OBJECTS OF THE INVENTION

It is an object of the invention, therefore, to provide a fluorescent light fixture having an improved light diffuser.

It is also an object of the invention to provide an improved light diffuser for a fluorescent light fixture which also functions as an air diffuser.

It is a further object of the invention to provide a combined light diffuser and air diffuser for a fluorescent light fixture which is simple to service and maintain.

It is still a further object of the invention to provide a combined light diffuser and air diffuser for a fluorescent light fixture which is tamper- and vandal-resistant.

It is another object of the invention to provide a combined light diffuser and air diffuser for a fluorescent light fixture which is self-cleaning.

It is yet another object of the invention to provide a fluorescent light fixture having a combined light diffuser and air diffuser adapted for use in a public vehicle which also incorporates a handrail as an integral part of the fixture.

It is still another object of the present invention to provide a combined light diffuser and air diffuser for a fluorescent light fixture which is adapted to be constructed by extrusion techniques.

It is a further object of the invention to provide a fluorescent light fixture having a combined light diffuser and air diffuser for use in vehicle compartments which also provides improved mixing and temperature equalization of the compartment air.

SUMMARY OF THE INVENTION

In accordance with the present invention, these and other objects are met by a fixture for a fluorescent lamp having a light diffuser comprises a base and a light diffusing panel mounted to the base and having mounting and electrical connection means for receiving a fluorescent lamp. The lamp mounting and connection means are located on a surface of the panel facing the base. The panel has openings therein for allowing air to circulate through the panel to allow cooling of the fixture and cleaning of such lamp and panel. The fixture includes hinge means supporting a first side of the panel and being affixed to the base for allowing the panel to be rotated about the hinge means. Also included are openable latch means having a portion affixed to the base and a portion affixed to a second side of the panel and supporting the second side. The latch means, when opened, permit lowering of the panel by rotation about the hinge means for allowing cleaning and maintenance of the fixture.

Also, in accordance with the present invention, a fixture for a fluorescent lamp having a diffuser for light and air comprises a base, a light and air diffusing panel, and nozzle means incorporated in the base. The light and air diffusing panel is mounted to the base and has mounting and electrical connection means for receiving a fluorescent lamp. The lamp mounting and connection means are located on a surface of the panel facing the base. The panel has openings therein for allowing air to circulate through the panel to allow cooling of the fixture and cleaning of the panel. The nozzle means has an entrance on the side of the base facing away from the panel and an exit on the side of the base facing toward the panel. The exit directs emerging air in a direction substantially parallel to the base. The nozzle means allows air to be pulled through the panel by suction action caused by an air stream moving through the nozzle means.

Further, in accordance with the invention, a diffuser panel for a fluorescent lamp fixture comprises a frame and longitudinal elements supported by the frame and spaced apart from one another, at least some of the elements being constructed of a material to allow diffusion of impinging light.

A still further aspect of the present invention encompasses a fluorescent light fixture for a passenger vehicle comprising means for mounting at least one fluorescent lamp, a diffuser having a central portion with openings therein and a pair of translucent side panels being disposed below the lamp and nozzle means disposed above the diffuser having a primary path and a narrow secondary path. The primary path has an entrance facing away from the diffuser and is adapted to be supplied with a high velocity air stream and has an exit directed toward the side of the vehicle. The primary path narrows from entrance to exit. The secondary path has an entrance directed toward the central portion of the diffuser and an exit which forms a junction with the primary path so that high velocity air directed through the primary path will cause air to be sucked upwardly through the central portion of the diffuser into the secondary path.

For a better understanding of the present invention, reference is made to the following description and accompanying drawings, while the scope of the present invention will be pointed out in the appended claims.

DESCRIPTION OF THE PREFERRED EMBODIMENTS

Figure 1:
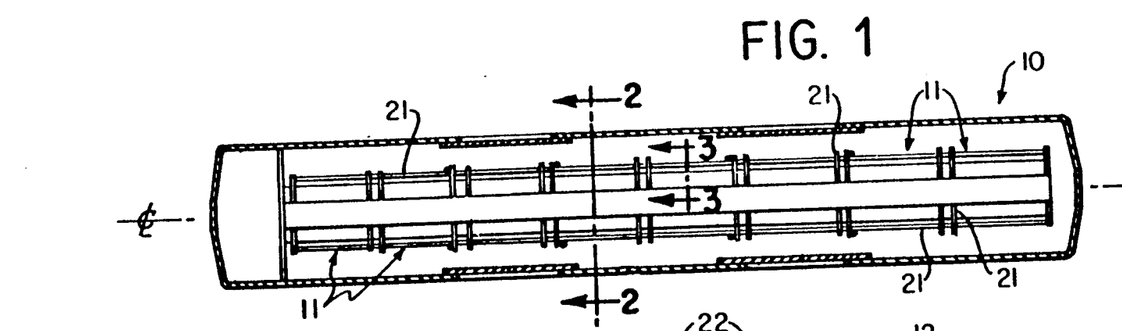
FIG. 1 is a schematic plan view of a railway car fitted with fluorescent fixture assemblies in accordance with the invention.
Figure 2:
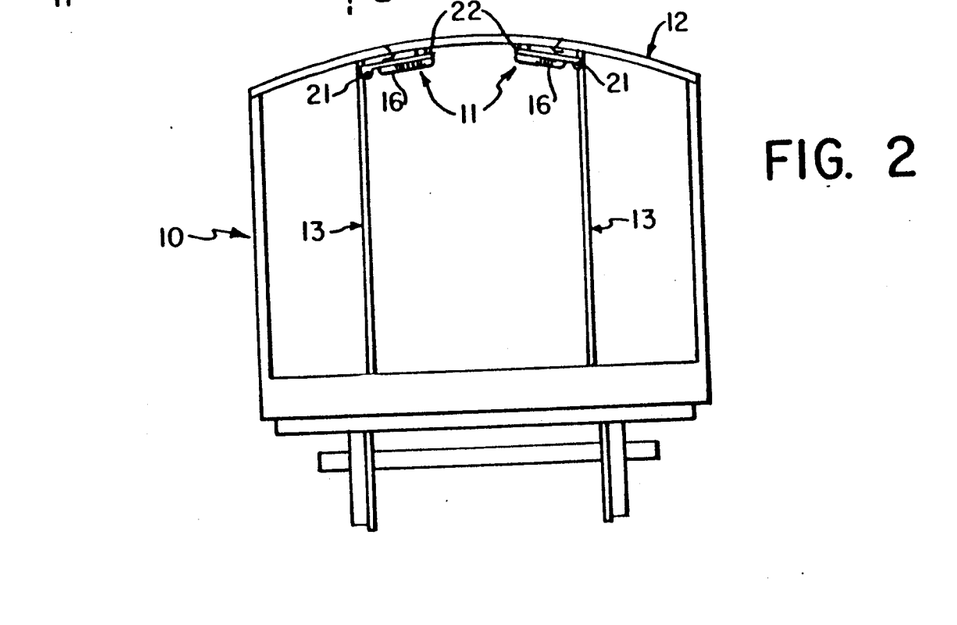
FIG. 2 is a cross-sectional view along 2—2 of FIG. 1 particularly illustrating the arrangement of the fixture assemblies within the car.

Referring initially to FIGS. 1 and 2, a subway car 10 is depicted in which fluorescent lamp fixtures 11 in accordance with the invention have been installed. The installation of the fixtures is made to the ceiling 12 of the car adjacent to vertical supporting pole 13. The fixtures 11 are designed to have identical repeated sections, each section capable of accommodating a 48 inch fluorescent lamp (T12 size). A portion of each fixture section includes a handrail 21 for being grasped by passengers. The side-to-side juxtaposition of the repeated fixture sections creates, in effect, a continuous handrail on either side of the car.

Figure 3:
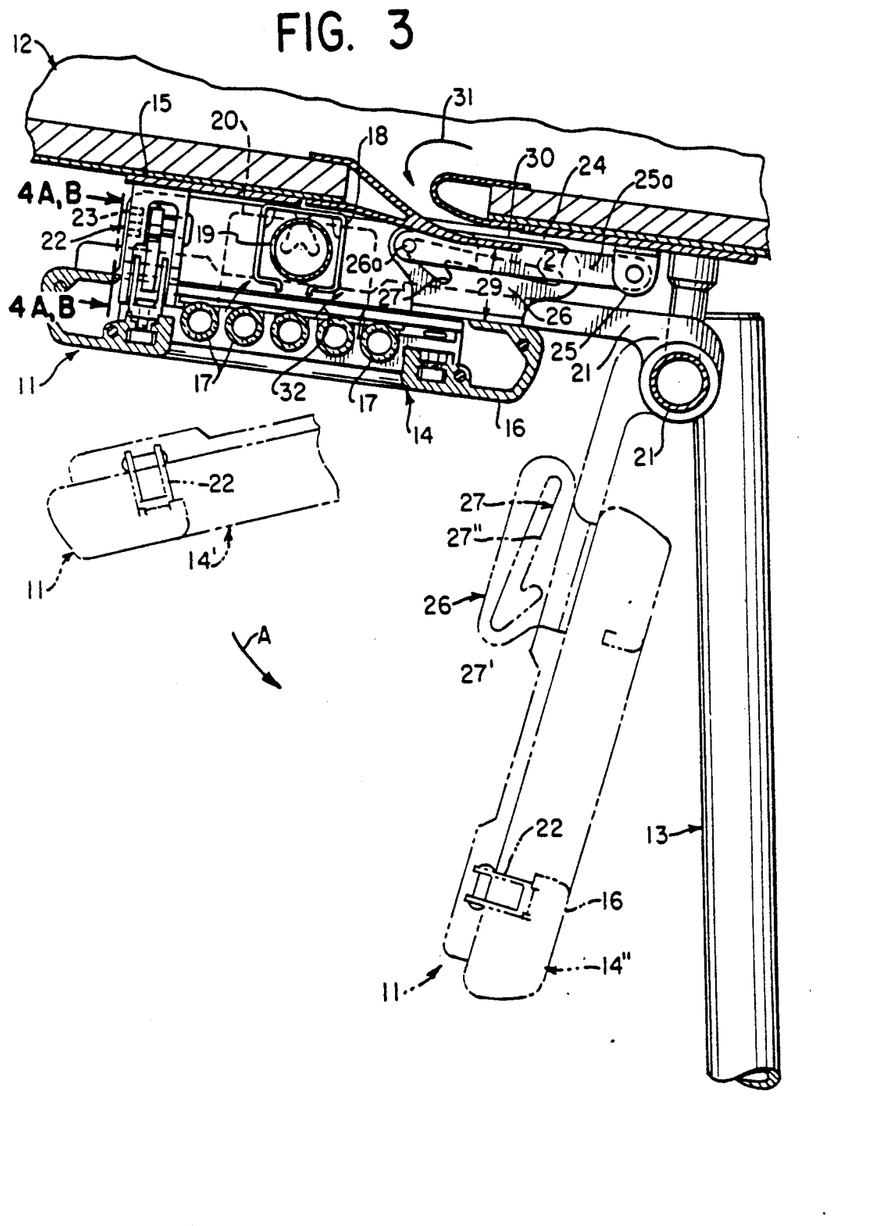
FIG. 3 is an enlarged cross-sectional view along 3—3 of FIG. 1 illustrating the fluorescent fixture of the present invention in detail, including location of the diffuser panel when opened for servicing.

Referring now to FIG. 3, the details of the construction of a fluorescent fixture section 11 are illustrated. Each fixture section includes a fixture base 15 which is affixed to the ceiling 12 of the subway car by means not shown. To the base 15 is attached a diffuser panel 14. The panel 14 is mounted so as to be substantially parallel to the base 15. The diffuser panel 14 includes a frame 16 which supports a plurality of longitudinal elements 17.

The longitudinal elements 17 are spaced apart from one another and, in a preferred arrangement, are substantially parallel to one another. They are preferably constructed of transparent or translucent material to refract, reflect and diffuse impinging light from a fluorescent lamp mounted above the panel. The preferred arrangement of FIG. 3 illustrates tubular, hollow, glass elements 17. Tempered glass is preferred for this application.

Figure 6:
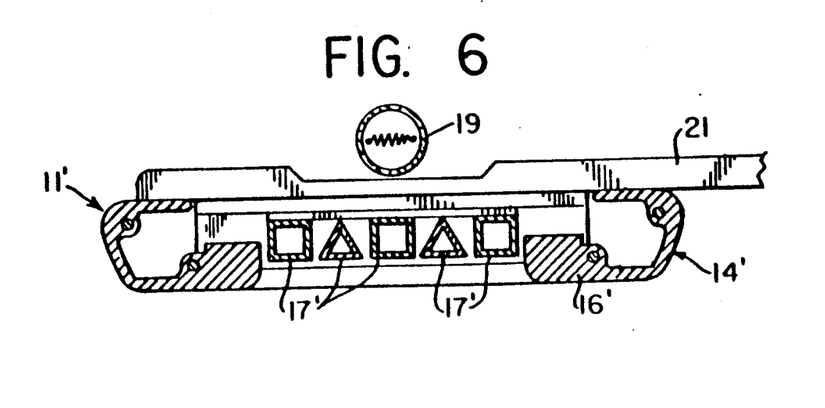
FIG. 6 is a cross-sectional view of another embodiment illustrating longitudinal diffusing members having differing cross-sections.

Depending on the application, longitudinal elements having differing cross-sections may be desired. FIG. 6 illustrates an embodiment of a diffuser panel 11' showing elements 17' having triangular and rectangular cross-sections in a single panel. Lamp 19 is shown above the longitudinal elements 17' in this view.

The materials possible for use in such panel may also be selected in accordance with the nature of light diffusion desired, as well as such other factors as cost, ease of manufacture and ability to withstand breakage. Transparent or translucent plastic material is within the scope of the invention, particularly clear acrylic plastic sold under the trade name "LUCITE" and a clear polycarbonate plastic sold under the trade name "LEXAN". Purely reflective or absorptive materials are also possible, such as polished or anodized aluminum rods made by extrusion.

The shape and spacing of the longitudinal elements are designed to permit dust and dirt to fall through the panel when no forced air is provided to the panel. When forced air is provided to the panel, as in a manner to be discussed below, the panel and longitudinal elements, also function as an air diffuser. The diffuser panel 14 is attached to the base 15 on either side of the frame 16. On one side, a hinged support 21 is provided. On the other side, the panel is supported by at least one panel latch 22. In a preferred arrangement, two panel latches are required for each section. The latch 22 has a portion affixed to the base and a portion affixed to the panel frame 16. To avoid unauthorized opening of the panel latch, a pair of panel latch releases 23 are provided for each fixture section which have a keying arrangement. The keying arrangement requires that a special tool be used to open the fixture.

The hinged support 21 serves a dual function. The support permits the panel to be lowered, when the latches 22 are opened, by rotation about the axis of the hinge. Along the axis of the hinge, in this preferred embodiment, a handrail is arranged for passengers to grasp.

A rotation-limiting mechanism 24 is provided to prevent the panel, when unlatched, from immediately dropping to a fully rotated position. The mechanism includes a hinge support 25 affixed to the base which cooperates with a rod 25a. Affixed to the end of the rod 25a is a camming element 26. A camming groove 27 is provided in a camming guide affixed to one side of the panel frame 16. The shape of the camming groove is such that, when the panel is opened, the cam 26a will travel only a short distance to 27'. In order to obtain full descent of the panel, it is necessary to raise the panel slightly to allow the cam 26 to travel to 27" in the camming groove 27.

Fluorescent lamp mounting members 18 are provided for allowing the lamp 19 to be installed and electrically connected in each fixture section. These members 18 are preferably mounted on opposite end portions of the panel frame 16 so that the lamp is centrally located above the longitudinal members 17 and substantially parallel to them.

A fluorescent ballast 20 is also mounted in the fixture section, preferably on one end of the panel frame. While the ballast 20 and lamp 19 could also be mounted to the base 15, there is a significant advantage in ease of maintenance to have these elements more readily accessible to a service person upon lowering of the panel. This lowering operation is shown in phantom lines in FIG. 3. The panel 14 is first rotated to a position 14' in the direction A and, finally, to a position 14". In this position, the lamp and ballast are readily accessible for servicing.

Figure 5:
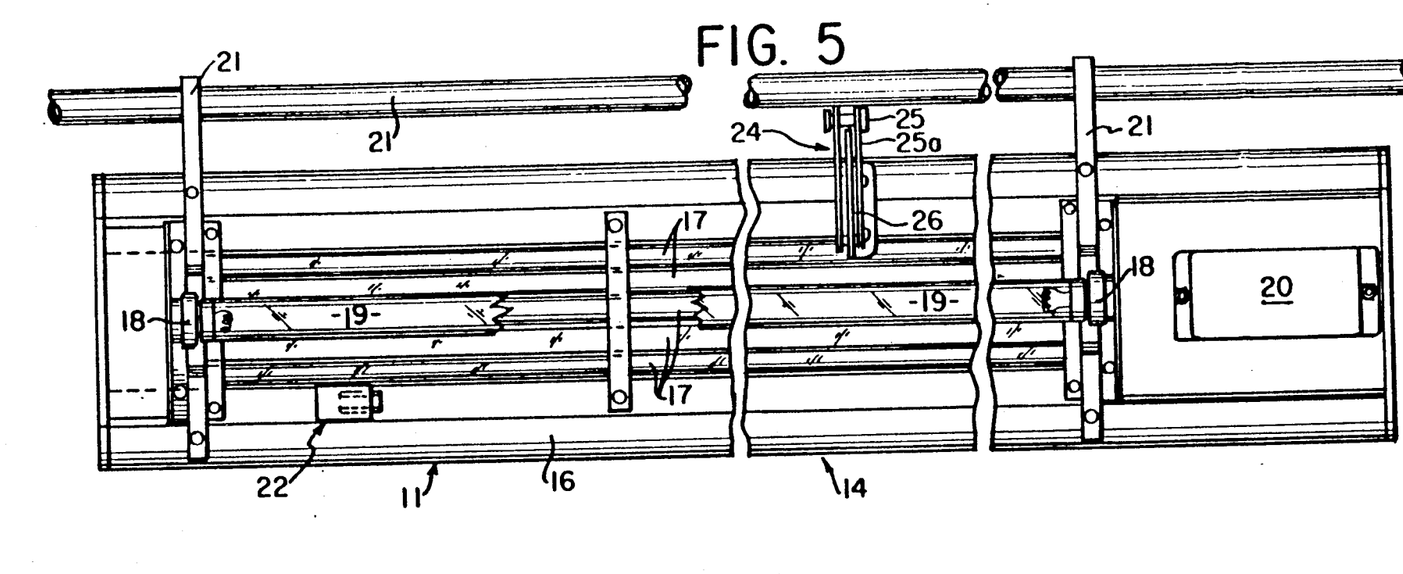
FIG. 5 is an enlarged bottom view of the diffuser panel.

A top view of the panel and fixture shown in FIG. 5 indicates the relative arrangement of the lamp 19 and ballast 20 with respect to the frame 16. Ballast 20 is mounted on an end portion of frame 16. Lamping mounting members 18 are mounted on opposite end portions of frame 16 to allow the lamp 19 to extend therebetween. Other elements bear like numerals to those elements shown in FIG. 3.

A principal feature of the fluorescent fixture 11 is the provision of nozzle or nozzles 28. Nozzle 28 is installed in base 15 so that the entrance of the nozzle is above the base while the exit 30 of the nozzle is below the base. The nozzle entrance has a larger cross-sectional area than the exit; the cross-sectional area gradually decreases from entrance to exit.

Provision of a high velocity stream of air 31 in the direction of arrow 31 will cause an area of negative pressure 29 below the nozzle exit 30. This, in turn, will cause by suction air from below the fixture to flow through the fixture, 32, to join the high velocity air at the nozzle exit. This effect is commonly known as a Venturi effect. The overall result will be to improve air circulation and equalize temperature distribution in the car. The high velocity air stream may be provided by warming or cooling air normally circulating in the car.

The nozzles 28 thus induct air from a room cavity to join the emitted air from a central forced-air heating or cooling equipment source. The combined mixed air is controlled in a preferred direction by orienting the nozzle appropriately. The induced vertical flow provides a cleansing of loose particles from the paths of light and maintains the full spacing between the longitudinal diffusing elements.

Figure 4A:
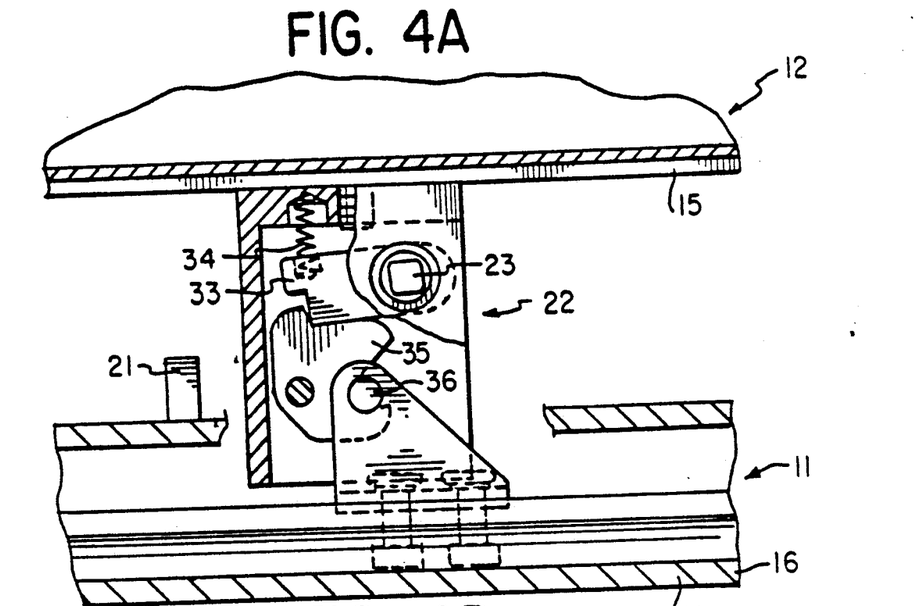
FIG. 4A and FIG. 4B are elevational views, partly broken away, taken along 4A,B-4A,B of FIG. 3, of the panel latch in closed and open position, respectively.
Figure 4B:
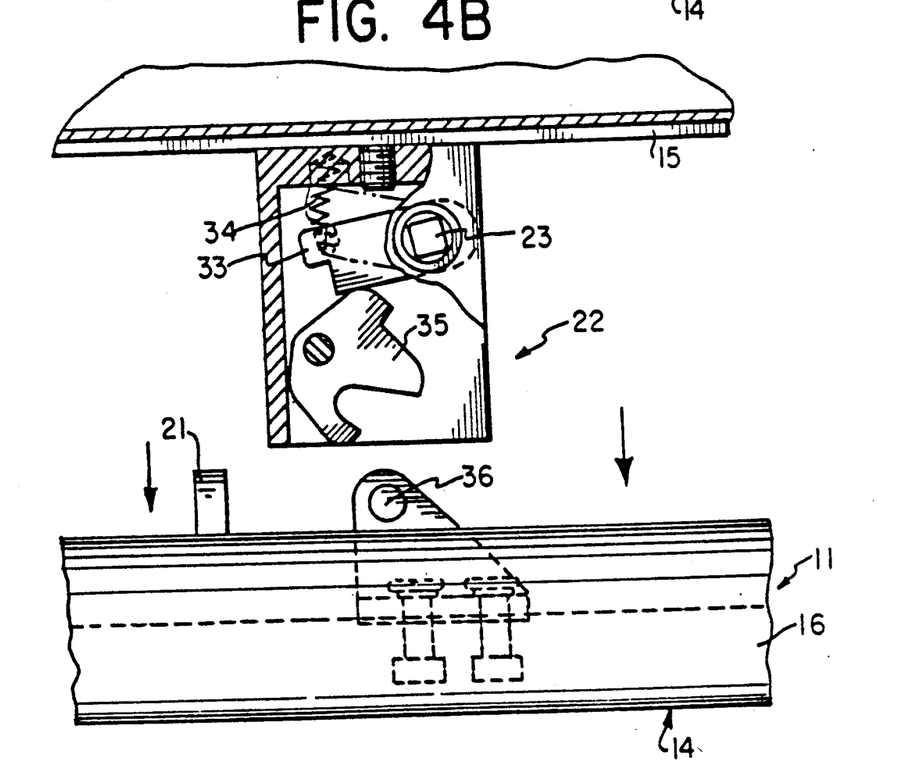

A preferred quick-release type panel latch 22 is shown in FIGS. 4A and 4B. In FIG. 4A the latch is closed. A hooked closing member 35 affixed to the base 15 engages a projection 36 forming part of a base member affixed to the panel frame 16. The closing member 35 is maintained in this condition by latch locking arm 33. Latch locking arm 33 includes a keying portion 23. When a keying tool turns the keying element 23, locking arm 33 is raised so as to release the closing member 35. The release is enhanced by spring 34. This opens the latch which enables the panel to be lowered, as is shown in FIG. 4B.

The diffuser panel frame 16 is preferably of aluminum construction. A preferred method for manufacturing the frame is by extrusion. Portions of the frame may be polished to a high metallic luster or anodized as desired.

The fluorescent fixture of the present invention includes a panel which functions as both light and air diffuser. Spaced-apart longitudinal elements within the panel permit air flow around them for purposes of cooling and self-cleaning. The longitudinal elements, preferably translucent or transparent, permit light to be directed through and around them.

A nozzle effect, forming part of the fixture, allows air to be inducted upward through the fixture to be combined with forced heating or cooling air for improved mixing and temperature equilibrium. This effect also cleans the fixture.

The mechanical arrangement of the fixture and panel permits easy maintenance (e.g., changing lamps) by simply lowering the panel. The arrangement also is tamper- and vandal-resistant. Handrails incorporated in the panel are particularly useful when the fixture is incorporated in a moving public vehicle.

Figure 7:
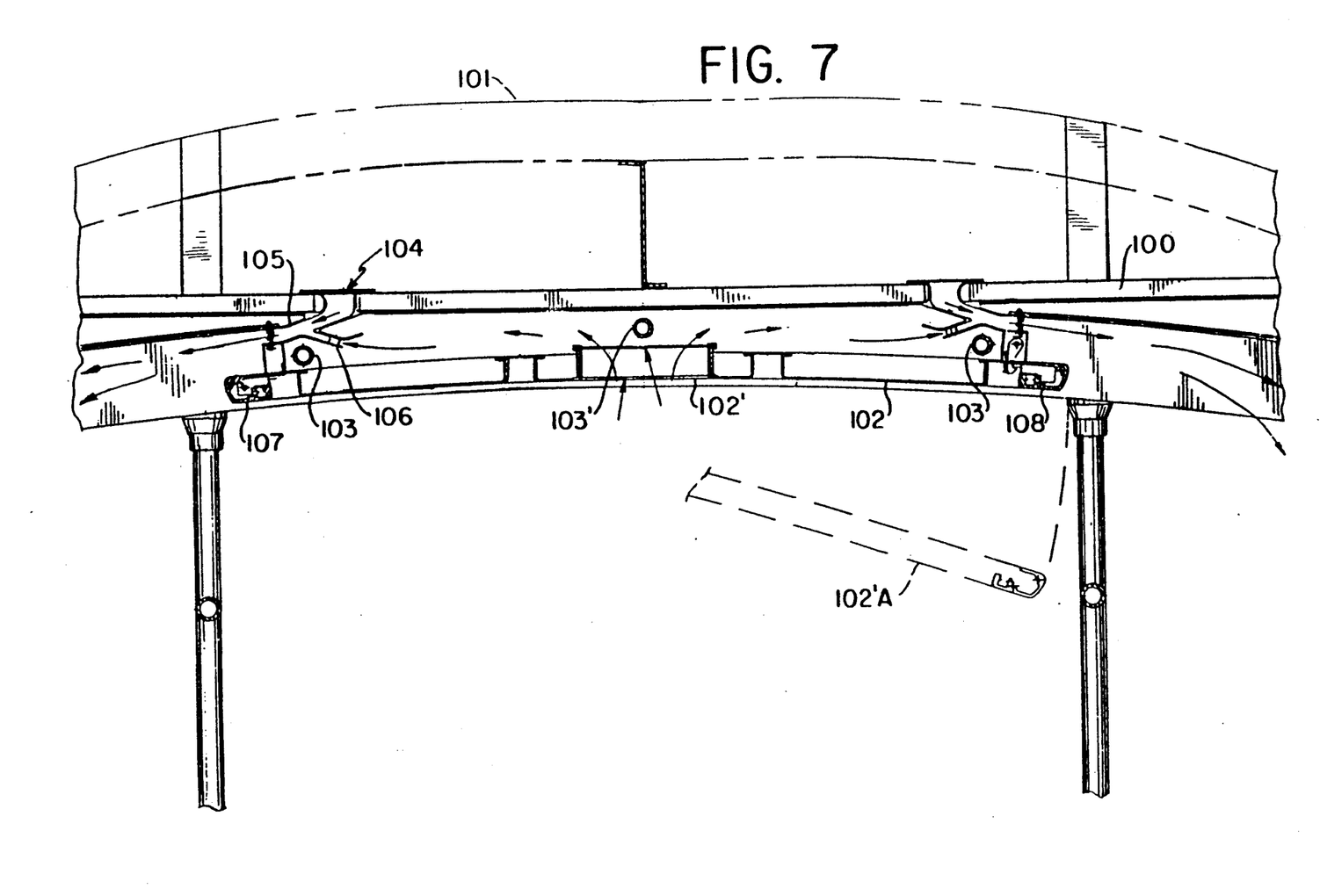
FIGS. 7, 8 and 9 illustrate, in cross-section, three additional embodiments of the invention having lowerable panels and a nozzle arrangement for air circulation through the fixture.

Referring now to FIG. 7, a further embodiment of the invention is illustrated. In this arrangement, the fluorescent fixture extends across the entire ceiling of the car. At either side of the ceiling, a fluorescent lamp 103 is mounted so as to extend parallel to the length of the car. Further, a central fluorescent lamp 103' is mounted so as to be parallel to the other lamps.

The diffuser for the fixture comprises a central portion 102' disposed below each side mounted lamp. The centrally mounted lamp and two side panels 103 disposed below each side mounted lamp. The central portion 102' has openings therein which may be of any known design such as a lattice or tubular shape. The central portion 102' acts as a light and air diffuser and will be described further below. The side panels 103 are typically transparent or translucent with no openings therein.

The entire diffuser is constructed as a single element and, by opening a concealed latch 108 at one side can be made to lower about hinge point 107 to allow for cleaning of the fixture or replacement of the lamps. The lamps are preferably mounted on the underside of the diffuser. The lowered position of the diffuser is shown in dashed lines as 102'A.

In this arrangement, a pair of nozzles 104 are shown. The nozzles are mounted in ceiling 100. The nozzles 104 comprise a narrowing path 105 from the area above the ceiling 100 (but below roof 101) in the direction of the side of the car and a substantially narrower path 106 which directs air from the central part of the fixture into the narrowing path 105.

Application of a high velocity (preferably cooler) air stream into path 105 will cause, by virtue of a suction effect, warm air to be sucked up through the central portion of the diffuser into the substantially narrower path 106. This will occur on either side of the car to provide circulation of air through the car. The diffuser and lamps will be cleaned by this circulation effect.

Figure 8:
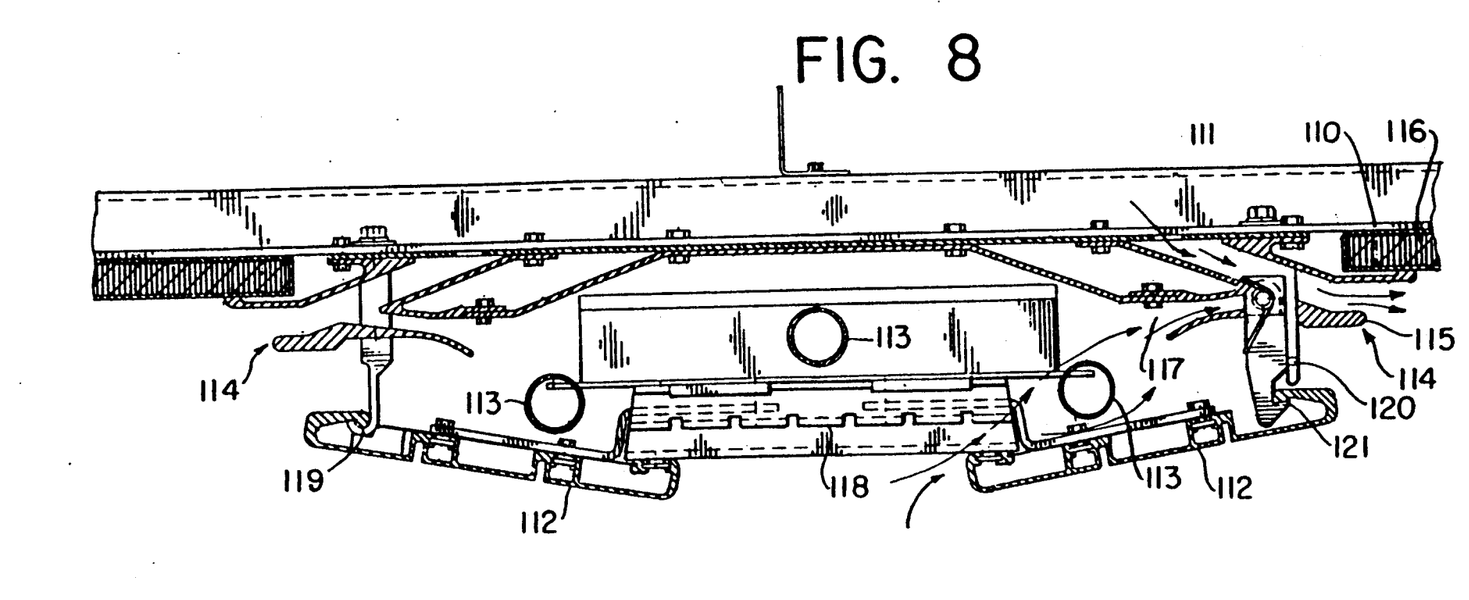

FIG. 8, an embodiment similar to that of FIG. 7, also illustrates a fluorescent lamp fixture having a light and air diffuser. The diffuser comprises two side panel 112 and a central portion 118. Three fluorescent lamps 113 are mounted in parallel, preferably to the top portion of the diffuser. The diffuser may be lowered to allow replacement of lamps and cleaning of the fixture by releasing latch 120, 121 to allow the diffuser to pivot about hinge point 119.

The central portion 118 of the diffuser is preferably an open lattice or tubular arrangement while the side panels 112 are transparent or translucent.

Nozzle arrangements 114 are provided on either side of the fixture. The nozzles include a primary air path 116 which narrows from the input end adjacent ceiling 110 to the output and is directed to the side of the car. An opening in the ceiling 111 permits high velocity, cooled air to enter the input end. A wing-like element 115 functions to form the lower portion of the primary air path and also a portion of the narrower secondary air path 117. Again, high velocity air through primary air path 117 will function to draw air through the central portion by suction and create a circulation path through the fixture.

Figure 9:
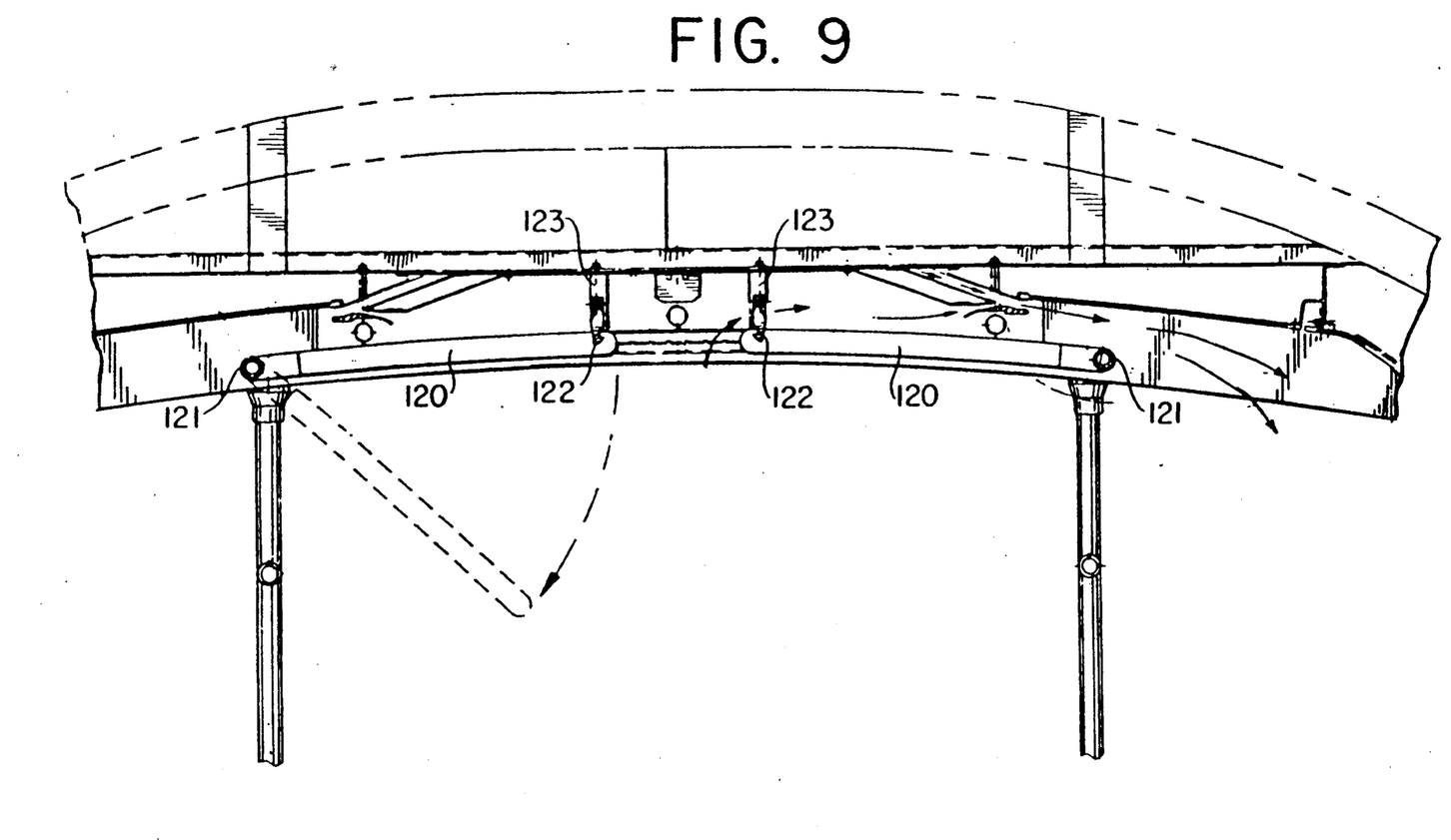

FIG. 9 shows an alternate embodiment where the central portion of the diffuser is supported by structural supports 123 and is fixed. Attached to these supports 123 on either side are latch mechanisms 122 which allow each side diffuser panel to be lowered about hinge elements 121.

While the foregoing description and drawings represent the preferred embodiments of the present invention, it will be obvious to those skilled in the art that various changes and modifications may be made therein without departing from the true spirit and scope of the present invention.

What is claimed is:

1. A fixture for a fluorescent lamp having a diffuser for light and air comprising:
   a base;
   a light and air diffusing panel mounted to said base having mounting and electrical connection means for receiving a fluorescent lamp, said lamp mounting and connecting means being located on a surface of said panel facing said base, said panel having openings therein for allowing air to circulate through said panel to allow cleaning of the panel; and
   nozzle means incorporated in said base having an entrance on a side of said base facing away from said panel and an exit on a side of said base facing toward said panel, said nozzle exit for directing emerging air in a direction substantially parallel to said base, said nozzle means for creating suction action to cause air to be pulled through said panel by action of a high velocity air stream being forced through said nozzle means.

2. The fixture of claim 1, including means for mounting the fixture in a vehicle compartment such that the high velocity air stream is produced by forced air circulation for said compartment.

3. The fixture of claim 2, wherein said forced air circulation is part of a heating or cooling arrangement for said compartment.

4. The fixture of claim 1, wherein the cross-sectional area of said nozzle entrance is substantially larger than the cross-sectional area of said nozzle exit, the cross-sectional area of said nozzle gradually diminishing from entrance to exit.

5. The fixture of claim 1, also including hinge means supporting a first side of said panel and affixed to said base, for allowing said panel to be rotated about said hinge means and openable latch means having a portion affixed to said base and a portion affixed to a second side of said panel and supporting said second side, said latch means when opened permitting lowering of said panel by rotation about said hinge means for cleaning and maintenance of said fixture.

6. The fixture of claim 1, wherein said panel includes longitudinal rods which are substantially parallel to and spaced apart from one another.

7. The fixture of claim 6, wherein at least some of said rods are made of glass.

8. The fixture of claim 5, wherein the base of the fixture is adapted to be mounted on a ceiling of a passenger vehicle and wherein said hinge means has a longitudinal axis and includes a handrail disposed along said axis for being grasped by passengers.

9. The fixture of claim 7, wherein said glass rods are made of tempered glass.

10. The fixture of claim 5, wherein said latch means includes a keyed portion requiring a keyed tool to open said latch means.

11. The fixture of claim 5, including a release latch for preventing the panel from rotating more than a predetermined amount.

12. The fixture of claim 11, wherein said release latch includes means for allowing said panel to rotate selectively to one of two different positions.

13. The fixture of claim 1, including means for mounting a fluorescent ballast to said panel.

14. A fixture for a fluorescent lamp having a diffuser for light and air and comprising:
   a base having mounting and electrical connection means
   for receiving a fluorescent lamp, a light diffusing panel, said panel having openings therein for allowing air to circulate through said panel for cleaning of the panel; and
   nozzle means incorporated in said base having an entrance on the side of said base facing away from said panel and an exit on the side of said base facing toward said panel, said nozzle exit for directing emerging air in a direction substantially parallel to said base, said nozzle means for creating suction action to cause air to be pulled through said panel by action of a high velocity air stream being forced through said nozzle means.

15. A fluorescent light fixture for a passenger vehicle comprising:
   means for mounting at least one fluorescent lamp;
   a diffuser having a central portion with openings therein and a pair of translucent side panels, said diffuser disposed below said lamp; and
   nozzle means disposed above said diffuser having a primary path and a secondary path, the primary path having an entrance facing away from said panel and adapted to be supplied with a high velocity air stream and having an exit directed toward the side of the vehicle, the primary path narrowing from entrance to exit; said secondary path having an entrance directed toward the central portion of the diffuser and which forms a junction with the primary path at its exit; said nozzle means providing an arrangement so that high velocity air directed through the primary path will cause air to be drawn upwardly through the central portion of the diffuser into the secondary path to cause circulation of air through the fixture.

16. A fluorescent light fixture as in claim 15 including means for mounting three fluorescent lamps, one over the central portion of the diffuser and one over each panel.

17. A fluorescent light fixture as in claim 15 wherein said mounting means are affixed to a top portion of the diffuser.

18. A fluorescent light fixture as in claim 15 including means to lower the diffuser for cleaning and for changing fluorescent lamps.

19. A fluorescent light fixture as in claim 18 wherein the means to lower the diffuser include a latch at one side of the diffuser and a hinge on the other side.

20. A fluorescent light fixture as in claim 15 including a pair of nozzle means, one mounted above each of the side panels of the diffuser.

21. A fluorescent light fixture as in claim 15 wherein the nozzle means includes a wing-like element forming a portion of the primary path and a portion of the secondary path.

22. A fluorescent light fixture as in claim 15 wherein the central portion of the diffuser is fixed and means are included for lowering the two side panels for cleaning the fixture and changing the lamps.

* * * * *